United States Patent
Kyburz et al.

[11] 3,884,967
[45] May 20, 1975

[54] TRICYCLIC AMINES AND PROCESSES FOR THE PREPARATION THEREOF

[75] Inventors: Emilio Kyburz, Reinach; Hans Spiegelberg, Basel, both of Switzerland

[73] Assignee: Hoffmann-LaRoche Inc., Nutley, N.J.

[22] Filed: Mar. 8, 1974

[21] Appl. No.: 449,405

Related U.S. Application Data

[60] Division of Ser. No. 107,499, Jan. 18, 1971, abandoned, which is a continuation-in-part of Ser. No. 679,644, Nov. 1, 1967, abandoned.

[52] U.S. Cl. ........... 260/501.1; 260/465 E; 260/505; 260/561 R; 260/561 B; 260/566 F; 260/576.6 M; 260/570.6; 260/570.8 TC; 260/590; 260/649 R; 260/649 F; 424/330
[51] Int. Cl. ............................................. C07c 119/00
[58] Field of Search .......... 260/566 F, 566 R, 501.1

[56] References Cited
UNITED STATES PATENTS
3,736,351   5/1973   Rey-Bellet et al. .............. 260/566 F

*Primary Examiner*—Gerald A. Schwartz
*Attorney, Agent, or Firm*—Samuel L. Welt; Bernard S. Leon; William G. Isgro

[57] ABSTRACT

1-Chloro- or 1-fluoro- derivatives of 5H-dibenzo[a,d]cycloheptenes and 1-chloro- or 1-fluoro- derivatives of 10,11-dihydr-5H-dibenzo[a,d]cycloheptenes having, at position 5, a basic exocyclic side chain of the formula

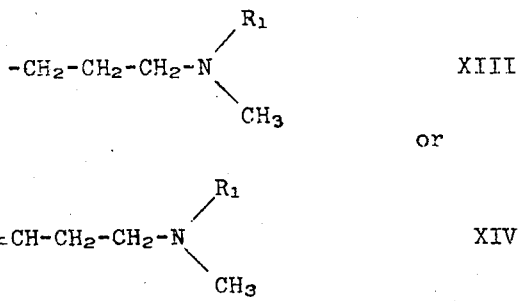

wherein $R_1$ is hydrogen or methyl,
and intermediates therefor are prepared by alternate procedures. The described end-products are useful, for example, as psychopharmacological antidepressants.

1 Claim, No Drawings

TRICYCLIC AMINES AND PROCESSES FOR THE PREPARATION THEREOF

This is a division of application Ser. No. 107,499 filed Jan. 18, 1971 which in turn is a continuation-in-part application of Ser. No. 679,644, filed Nov. 1, 1967, both of which are now abandoned.

BACKGROUND OF THE INVENTION

5H-Dibenzo[a,d]cycloheptenes and 10,11-dihydro-5H-dibenzo [a,d]cycloheptenes having a basic side chain in the 5-position, for example, 10,11-dihydro-5-(3-dimethylaminopropylidene)-5H-dibenzo[a,d]cycloheptene (amitriptyline) and 10,11-dihydro-5-(3-methylaminopropylidene)-5H-dibenzo[a,d]cycloheptene (nortriptyline), are known for their psychopharmacological antidepressant properties.

The compounds of this invention of hereinafter described formulas Ia and Ib, which differ from the prior art compounds by the presence of a chlorine or fluorine at position-1, unexpectedly exhibit substantially increased antidepressant activity and significantly decreased toxicity. Also, they show a substantial absence of anticholinergic activity. Anticholinergic activity is not desirable in psychopharmacological antidepressant compounds, and its absence is particularly advantageous. Additionally, the compounds of formulas Ia and Ib are characterized by their action on the nervous systems, for example, they possess narcosis potentiating, adrenolytic, sedative, antihistaminic and local anesthetic activities.

BRIEF DESCRIPTION OF THE INVENTION

This invention relates to novel derivatives of 5H-dibenzo [a,d]cycloheptenes useful as psychopharmacological antidepressant agents and to novel intermediates useful in the preparation thereof. In particular, the invention relates to psychopharmacological antidepressant tricyclic amines of the formulas

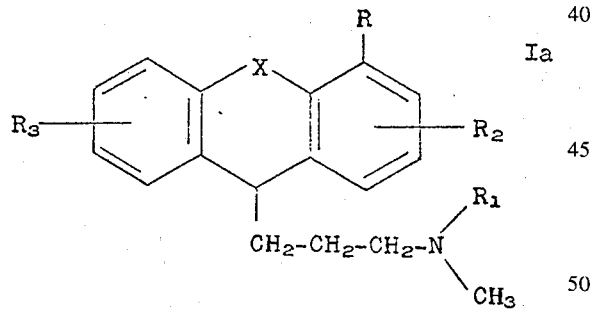

and

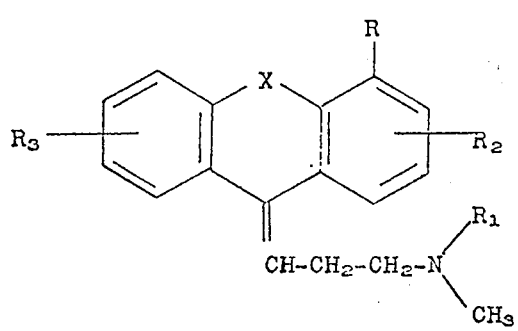

wherein R is chlorine or fluorine, $R_1$ is hydrogen or methyl, $R_2$ and $R_3$ are hydrogen, chlorine or fluorine, and X is ethylene, vinylene or halo-substituted vinylene, and the pharmaceutically acceptable acid addition salts thereof. The compounds of formulas Ia and Ib and their pharmaceutically acceptable salts are useful, for example, as pyschopharmacological antidepressants.

DETAILED DESCRIPTION OF THE INVENTION

This invention relates to tricyclic amines of the formulas

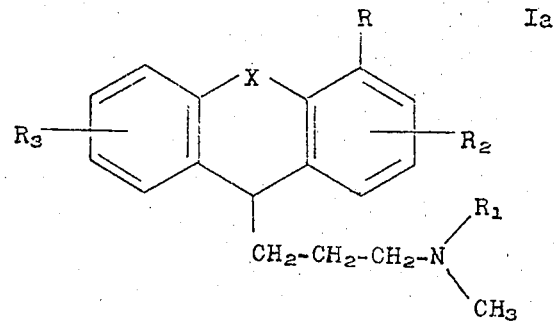

and

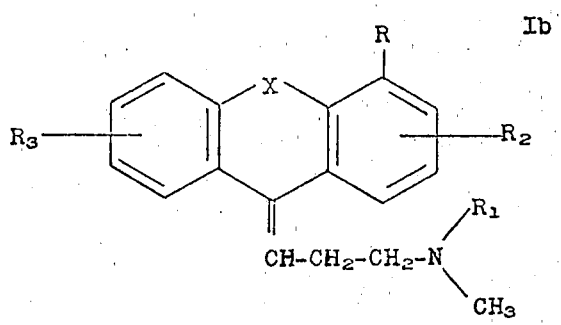

wherein R is selected from the group consisting of chlorine and fluorine, $R_1$ is selected from the group consisting of hydrogen and methyl, $R_2$ and $R_3$ are selected from the group consisting of hydrogen, chlorine and fluorine and X is selected from the group consisting of ethylene, vinylene and halosubstituted vinylene, and pharmaceutically acceptable acid addition salts thereof.

As used herein, the terms "halo" and "halogen" denote chlorine, bromine, fluorine and iodine, preferably chlorine and bromine. As used herein, the term "lower alkyl" denotes a straight chain or branched chain alkyl group containing 1–7 carbon atoms, e.g., methyl, ethyl, propyl, isopropyl, butyl, pentyl, hexyl and the like.

Unsymmetrically substituted compounds of formula Ib, which have an exocyclic double bond in the 5-position, form geometric isomers which hereinafter will be referred to as the α- or the β-isomer. This invention includes all the geometric isomers of the compounds of formula Ib whether they be obtained as mixtures or as an individual isomer. The isomers of the compounds of formula Ib exhibit psychopharmacological antidepressant activity as well as the other activities mentioned hereinbefore, and are particularly useful as psychopharmacological antidepressants.

Unsymmetrically substituted compounds of formula Ia form optical isomers. These isomers as well are included in the invention. They show the same useful activities as indicated hereinbefore.

A preferred subgenus of the compounds of formula Ia is represented by the formula

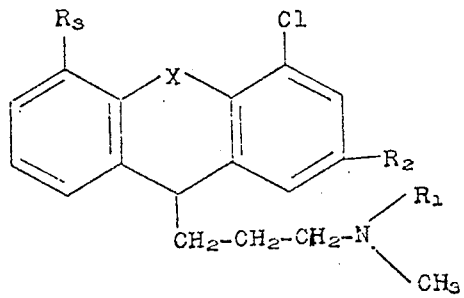

Ic wherein $R_1$ is hydrogen or methyl, $R_2$ and $R_3$ are hydrogen, chlorine or fluorine, and X is ethylene, vinylene or halo-substituted vinylene, and pharmaceutically acceptable acid addition salts thereof.

A more preferred subgenus comprises a compound of formula Ic wherein $R_2$ and $R_4$ are hydrogen.

A preferred subgenus of the compounds of formula Ib is represented by the formula

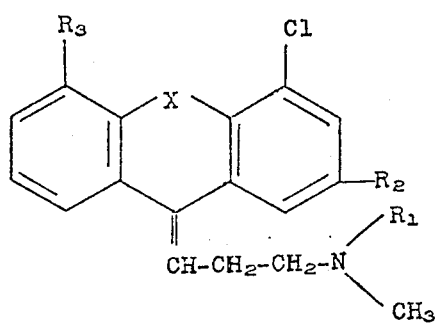

Id wherein $R_1$ is hydrogen or methyl, $R_2$ and $R_3$ are hydrogen, chlorine or fluorine, and X is ethylene, vinylene, or halo-substituted vinylene, and pharmaceutically acceptable acid addition salts thereof.

A more preferred subgenus comprises a compound of formula Id wherein $R_2$ and $R_3$ are hydrogen.

Compounds of this invention corresponding to formulas Ia and Ib are exemplified by the following:

1-chloro-10,11-dihydro-5-(3-methylaminopropyl)-5H-dibenzo-[a,d]cycloheptene;

1-chloro-5-(3-dimethylaminopropylidene)-5H-dibenzo[a,d]cycloheptene;

the β-isomer of 1-chloro-5-(3-dimethylaminopropylidene)-5H-dibenzo[a,d]cycloheptene;

1-chloro-5-(3-methylaminopropylidene)-5H-dibenzo[a,d]cycloheptene;

the β-isomer of 1-chloro-5-(3-methylaminopropylidene)-5H-dibenzo[a,d]cycloheptene;

1-chloro-10,11-dihydro-5-(3-dimethylaminopropyl)-5H-dibenzo[a,d]cycloheptene;

1-chloro-10,11-dihydro-5-(3-dimethylaminopropylidene)-5H-dibenzo[a,d]cycloheptene;

the β-isomer of 1-chloro-10,11-dihydro-5-(3-dimethylaminopropylidene)-5H-dibenzo[a,d]cycloheptene;

1-chloro-5-(3-dimethylaminopropyl)-5H-dibenzo[a,d]cycloheptene;

1-fluoro-10,11-dihydro-5-(3-dimethylaminopropylidene)-5H-dibenzo[a,d]cycloheptene;

1-fluoro-10,11-dihydro-5-(3-dimethylaminopropyl)-5H-dibenzo[a,d]cycloheptene;

1-chloro-10 (or 11)-bromo-5-(3-dimethylaminopropylidene)-5H-dibenzo[a,d]cycloheptene;

1,10 (or 11)-dichloro-5-(3-dimethylaminopropylidene)-5H-dibenzo[a,d]cycloheptene;

1,3-dichloro-10,11-dihydro-5-(3-dimethylaminopropylidene)-5H-dibenzo[a,d]cycloheptene;

the β-isomer of 1,3-dichloro-10,11-dihydro-5-(3-dimethylaminopropylidene)-5H-dibenzo[a,d]cycloheptene;

1,3-dichloro-10,11-dihydro-5-(3-dimethylaminopropyl)-5H-dibenzo[a,d]cycloheptene; and 1,9-dichloro-10,11-dihydro-5-(3-dimethylaminopropylidene)-5H-dibenzo[a,d]cycloheptene.

The tricyclic amines of the invention can be prepared utilizing several alternate processes, for example:

1. A compound of the formula

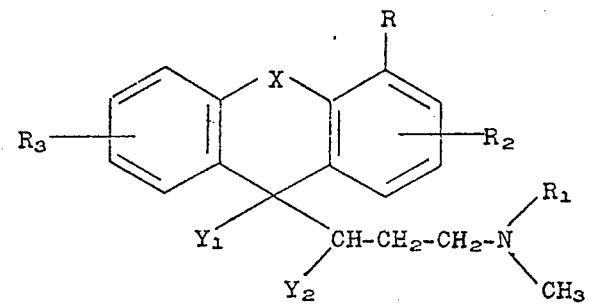

II wherein R, $R_1$, $R_2$, $R_3$ and X are as previously described and one of $Y_1$ or $Y_2$ is hydrogen and the other is hydroxy, can be reduced or dehydrated to form the corresponding compound of formulas Ia or Ib;

2. A compound of the formula

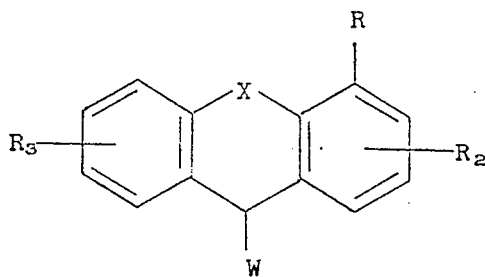

III wherein R, R₂, R₃ and X are as previously described and W is halogen,
can be reacted with a dimethylaminopropyl magnesium halide to form the corresponding compound of formula Ia;

3. A compound of the formulae

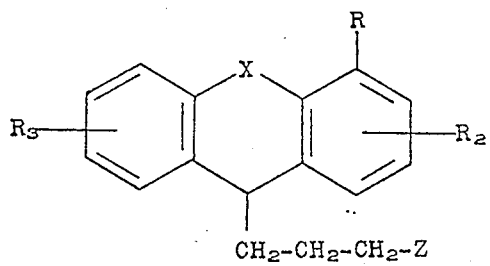

IVa

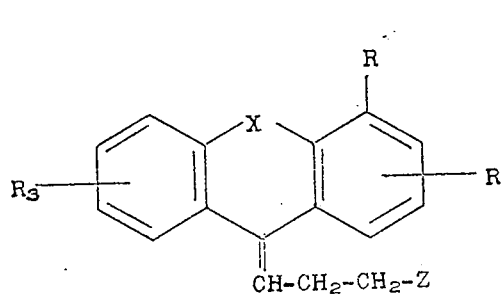

IVb

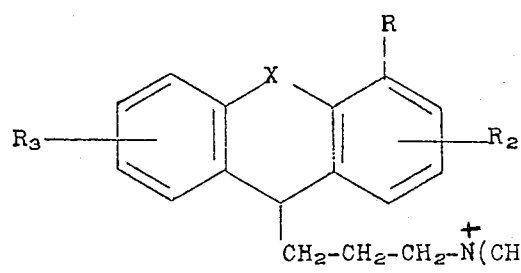

Va

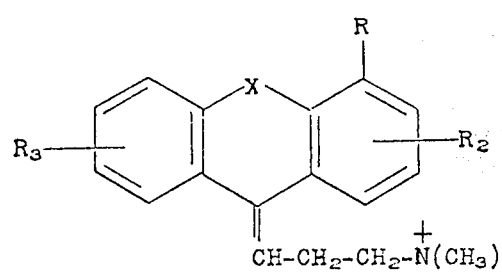

Vb or

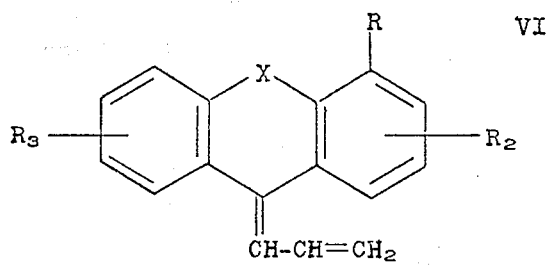

VI wherein R, R₂, R₃ and X are as described above, Z is halogen or a substituted sulfonyloxy residue, and A is the anion of an acid,
can be treated with methylamine or dimethylamine to form the corresponding compound of formulas Ia or Ib;

4. A primary amine of the formula

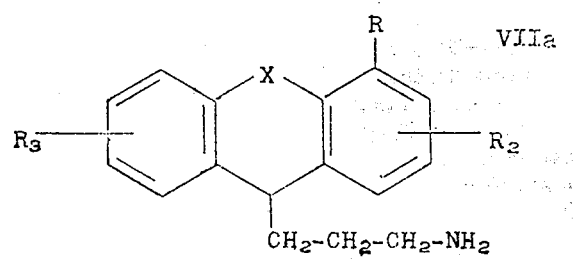

VIIa or

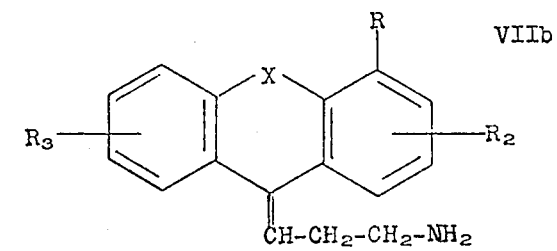

VIIb wherein R, R₂, R₃ and X are as previously described, can be methylated to form the corresponding compound of formulas Ia or Ib;

5. A compound of the formula

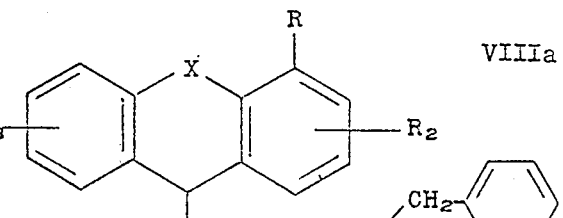

VIIIa or

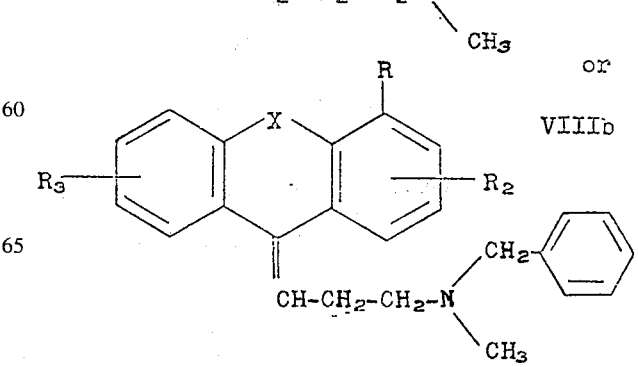

VIIIb wherein R, R₂, R₃ and X are as previously described, can be debenzylated to form the corresponding compound of formulas Ia or Ib;

6. A compound of the formula

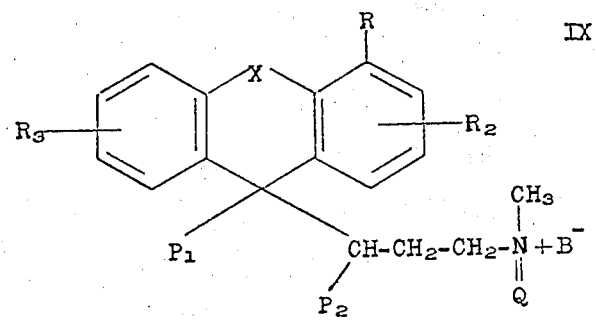

IX wherein R, R₂, R₃ and X are as previously described, one of P₁ or P₂ is hydrogen and the other is hydrogen or hydroxyl, or P₁ and P₂ taken together represent an additional bond, Q is a residue of an aldehyde, and B is the anion of an acid, can be treated with aqueous acid at elevated temperature to form the corresponding compound of formula Ib;

7. A compound of the formula

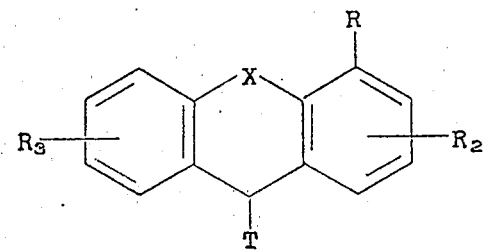

X wherein R, R₂, R₃ and X are as previously described, and T is an alkali-metal atom, such as sodium, potassium and the like, can be reacted with a compound of the formula

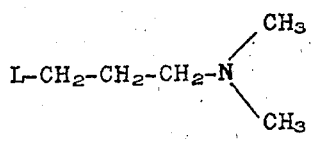

XI wherein L is a halogen or a substituted sulfonyloxy residue, to form the corresponding compound of formula Ia; or 8. A compound of the formula

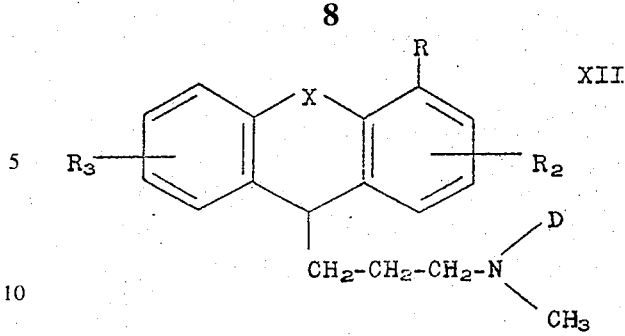

XII wherein R, R₂, R₃ and X are as previously described, and D is acyl or an esterified carboxyl, can be hydrolytically cleaved, whereupon, if desired, in optional sequence, if a monomethylamino compound is obtained, it can be methylated; if a dimethylamino compound is obtained, it can be converted by demethylation into a monomethylamino compound; if a product with an unsubstituted ethylene or vinylene group X is obtained, this group can be converted into a halogenated vinylene group; if a 10,11-dihydro-compound is obtained, it can be dehydrogenated. Furthermore, if desired, the geometric or optical isomers can be isolated from an isomeric mixture obtained, and a base obtained can be converted into a salt.

According to a preferred embodiment of a process of the invention, a carbinol of general formula II is reduced or dehydrated. Preferred starting substances are compounds of formula II wherein Y₁ is a hydroxyl and Y₂ is hydrogen. The reduction of compounds of formula II leads to exocyclically saturated compounds of formula Ia. The reduction may be conveniently carried out with a nascent hydrogen produced by reacting, for example, zinc in glacial acetic. Another very suitable reducing agent is hydroiodic acid. By treatment of a compound of formula II with hydroiodic acid, especially in the presence of red phosphorus, the compounds of formula Ia which are saturated in the 10,11-position, are easily obtained. In conducting the reduction, it is preferred to work in the presence of a solvent, such as, acetic acid or acetic acid anhydride, at a temperature in the range of room temperature and the boiling point of the reaction mixture.

The dehydration of compounds of formula II leads to compounds of formula Ib, having an exocyclic double bond in the 5-position. This dehydration is conveniently carried out using a mineral acid, such as, hydrochloric or hydrobromic acid, in which case the dehydration can be carried out in an anhydrous or an aqueous medium. The dehydration is preferably carried out in ethanolic hydrochloric acid at a temperature in the range of room temperature and the boiling point of the reaction mixture. However, dehydration can also be accomplished utilizing heat, for example, at 50°C. to reflux temperature, preferably at reflux temperature, with a high-boiling anhydrous solvent, such as, dimethyl sulfoxide. Other known dehydrating agents can also be employed, for example, acetyl chloride, acetic acid anhydride, trifluoroacetic acid anhydride, sulfuric acid, phosphorus oxychloride, p-toluenesulfonyl chloride, zinc chloride, potassium bisulfate, or the like. An inert organic solvent, such as chloroform, methylene chloride, or the like, can be employed at a temperature in the range of room temperature and the boiling point of the reaction mixture.

The carbinol of formula II can be prepared by known procedures, for example, by reaction of the corresponding tricyclic 5-ketone with suitable Grignard compounds. The tricyclic 5 ketones of the formula

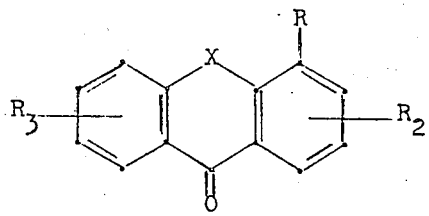

XV wherein R, R₂, R₃ and X are as previously described, can be prepared by methods known per se (see e.g. J.Med.Chem. 8(6) 1965). These methods are also illustrated in Examples 9, 11, 12, 13 and 15 hereinafter. It is to be noted that the introduction of a halogen atom into the 10 (or 11)-position of 1-chloro (or fluoro)-5H-dibenzo[a,d]cyclohepten-5-one is preferably effected by addition of the desired halogen with simultaneous irradiation. After addition of an alkali, the resulting 1-chloro (or fluoro)-10,11-dihalo-10,11-dihydro-5H-dibenzo[a,d]cyclohepten-5-one splits off one molecule of hydrogen halide, whereby the 1-chloro (or fluoro)-10 (or 11)-halo-5H-dibenzo[a,d]cyclohepten-5-one is obtained.

Carbinols of formula II wherein Y₁ is hydroxyl and Y₂ is hydrogen are conveniently obtained as follows:

When a carbinol of formula II wherein R₁ is methyl is to be prepared, the corresponding tricyclic 5-ketone is reacted directly with, for example, dimethylaminopropyl magnesium chloride, and the reaction product is subsequently hydrolyzed. If R₁ is hydrogen, it is preferred to use methyl-benzyl-aminopropyl magnesium chloride as the reagent for the reaction. After complete reaction and subsequent hydrolysis, the resulting product is reacted with ethyl chloroformate to form 5-hydroxy-5-[3-(methyl-carbethoxy-amino)-propyl] compound which is hydrolyzed, whereupon a spontaneous decarboxylation occurs with the concurrent formation of the corresponding 5-hydroxy-5-(3-methylaminopropyl) compound.

Carbinols of formula II, wherein Y₁ is hydrogen and Y₂ is hydroxyl are obtained, for example, by reacting a corresponding tricyclic 5-ketone with ethyl magnesium bromide and hydrolyzing the reaction product. The resulting 5-hydroxy-5-ethyl compound is dehydrated with acetyl chloride and, subsequently, treated with formic acid and hydrogen peroxide. The 5-hydroxy-5-(1-hydroxyethyl) compound which forms is dehydrated with aqueous sulfuric acid to yield the corresponding 5-acetyl compound. By treatment with formaldehyde and methyl- or dimethylamine hydrochloride, there is obtained a 5-(methyl- or dimethylaminopropionyl) compound which, after reduction with sodium borohydride, yields the corresponding carbinol.

According to another embodiment of a process of the invention, a halide of formula III is reacted with a dimethylaminopropyl magnesium halide to form the corresponding exocyclically saturated compound of formula Ia. This process is particularly suitable for the preparation of those exocyclically saturated compounds of formula Ia which simultaneously carry a double bond in the 10,11-position. Preferably, a compound of formula III wherein W is chlorine, in a solid, finely powdered form or in an organic solvent, such as, for example, absolute ether, benzene, tetrahydrofuran, or the like, is introduced into a suspension of dimethylaminopropyl magnesium chloride in one of the solvents mentioned hereinbefore. The reaction is conveniently carried out at a temperature in the range of room temperature and the boiling point of the reaction mixture. After complete reaction, the reaction product is subjected to hydrolysis, preferably under practically neutral conditions, for example, by treatment with aqueous ammonium chloride solution.

The starting halide of formula III can be prepared according to known methods, for example, by the reduction of the corresponding tricyclic 5-ketone and subsequent halogenation of the resulting 5-hydroxy compound.

A further embodiment of a process of the invention comprises treating a compound of general formulas IVa, IVb, Va, Vb or VI with methylamine or dimethylamine. In the above formulas IVa and IVb, Z preferably is a chlorine or bromine atom. The substituted sulfonyloxy residues, as a meaning for Z, are preferably lower alkyl-sulfonyloxy residues, such as mesyloxy; phenylsulfonyloxy residues; lower alkylphenylsulfonyloxy residues, such as tosyloxy; or phenyl-(lower alkyl)-sulfonyloxy residues, such as phenylmesyloxy. The anion A is preferably derived from an inorganic acid, such as, hydrochloric acid, hydrobromic acid, hydroiodic acid, sulfuric acid or the like.

The reaction of methyl- or dimethylamine with a compound of formulas IVa or IVb, especially those wherein Z is halogen, represents a preferred process of the invention.

The reaction of compounds of formulas IVa, IVb, VA, Vb or VI with methyl- or dimethylamine is conveniently carried out in a closed vessel at elevated temperature, preferably in the range of about 50°–175°C. The reaction can be effected in an inert organic solvent, such as methanol, ethanol, benzene, toluene or the like. Preferably, the reaction is conducted in the presence of an excess of methyl- or dimethylamine. In the case of reaction of compounds of formulas IVa and IVb, the excess amine serves as an acid-binding agent. Other acid-binding agents, such as, anhydrous potassium carbonate, can also be employed. The compounds of formula VI are preferably reacted in the presence of a metal, such as, for example, sodium or lithium, a metal amide, such as, for example, sodium or potassium amide, or a metal-organic compound, such as, for example, phenyl-lithium or a Grignard compound. Particularly advantageous is the use of a Grignard compound.

The starting compounds of formulas IVa and IVb can be prepared, for example, by reaction of the corresponding tricyclic 5-ketone with methoxypropyl magnesium halide, subsequent hydrolysis, reduction or dehydration of the resulting carbinol, and treatment of the dehydrated product with a halogenating agent. The quaternary salts of formulas Va and Vb, which can also be employed as the starting material, can be obtained by quaternization of the corresponding amino, monomethylamino or dimethylamino compound with a methylating agent, such as methyl chloride, methyl bromide, methyl iodide, dimethyl sulfate, or the like. The starting compound of formula VI is obtainable, for example, from the corresponding tricyclic 5-ketone by reaction with an allyl Grignard compound.

According to another process of the invention, a primary amine of formulas VIIa or VIIb is methylated. The methylation can be carried out by treatment with a known methylating agent, such as, for example, methyl iodide, methyl tosylate, dimethyl sulfate, or the like, preferably at a temperature in the range of 15°–75°C. According to another procedure, a mixture of formaldehyde and formic acid, preferably in excess, is reacted with a primary amine of formulas VIIa or VIIb at an elevated temperature in the range of about 50°C. and the boiling point of the reaction mixture.

A preferred process for the preparation of secondary amines of formulas Ia or Ib comprises reacting the corresponding primary amine of formula VIIa or VIIb with a haloformic acid ester, such as, for example, chloro- or bromoformic acid ethyl ester, to form a carbamate, and, subsequently, reducing the carbamate with a metal hydride, such as, lithium aluminum hydride, diisobutyl aluminum hydride, or the like. Both reaction steps are preferably carried out in an inert solvent, for example, ether, tetrahydrofuran, or the like, at a temperature in the range of about room temperature and the reflux temperature of the reaction mixture, preferably at reflux temperature.

According to another process for the preparation of secondary amines of formulas Ia or Ib, a primary amine of formulas VIIa or VIIb is reacted with chloral, preferably in an inert solvent, such as chloroform, benzene, or the like, at an elevated temperature in the range of about 50°C. and the boiling point of the reaction mixture. The resulting formylamino compound is reduced to the secondary amine corresponding to formulas Ia or Ib with a metal hydride, such as, lithium aluminum hydride, in anhydrous ether.

Still another process for the preparation of secondary amines of formulas Ia or Ib comprises the reaction of a primary amine of formulas VIIa or VIIb with formaldehyde, preferably in an inert solvent such as benzene, toluene, and the like, at a temperature in the range of about room temperature and the boiling point of the reaction mixture. The resulting Schiff's base is subsequently converted into the corresponding secondary amine of formulas Ia or Ib by reduction. This reduction is conveniently effected with a metal hydride, such as, sodium borohydride or lithium aluminium hydride, in anhydrous ether or dioxane.

The starting compounds of formulas VIIa and VIIb can be obtained in several ways. The aminopropylidene compounds of formula VIIb are obtained, for example, by exchange of the keto group of the corresponding 5-ketone with an ethylidene group, for example, by means of Grignard, and subsequent halogenation, treatment with a cyanide, and hydrolysis. The aminopropyl compounds of formula VIIa are conveniently prepared by reaction of the corresponding 5-methoxypropyl or 5-methoxypropyl-5-hydroxy compound with hydrogen iodide, treatment of the resulting iodopropyl compound first with potassium phthalimide and, subsequently, with hydrazine.

According to a further process of the invention, compounds of formulas VIIIa or VIIIb are debenzylated. In the debenzylation, the benzyl group bound to the nitrogen atom is exchanged for a hydrogen atom, to yield the corresponding secondary amine of formulas Ia or Ib. This reaction is conveniently carried out by reduction with an alkali metal, such as, for example, sodium or lithium, in liquid ammonia. In the debenzylation procedure, the double bonds which are present are substantially retained.

The starting compounds of formulas VIIIa and VIIIb are conveniently obtained by the reaction of the corresponding compound of formulas IVa, IVb, Va, Vb or VI with methylbenzylamine.

A still further process of the invention comprises the treatment of a compound of formula IX with aqueous acid at elevated temperature, resulting in the dehydration of the carbinol of formula IX. The substituent Q is simultaneously removed and there results the corresponding secondary amine of formulas Ia or Ib. in formula IX, Q preferably is the residue of an aromatic aldehyde, such as, for example, benzylidene or the like. The residue B preferably is the anion of a strong inorganic or organic acid, such as, for example, hydrochloric acid, sulfuric acid, methanesulfonic acid, benzenesulfonic acid, or the like, particularly preferred is the anion of toluenesulfonic acid. According to a preferred embodiment, a compound of formula IX, wherein $P_1$ is hydroxyl and $P_2$ is hydrogen, is reacted with aqueous sulfuric acid at a temperature in the range of about 50°–150°C.

The starting compound of formula IX is obtained, for example, by reacting the corresponding 5-hydroxy-5-(3-aminopropyl) compound (prepared by reacting the corresponding 5-ketone with an alkalimetal and treatment of the resulting alkali-metal compound with an aminopropyl halide), a corresponding 5-(3-amino-1-hydroxypropyl) compound (prepared by reacting the corresponding 5-acetyl compound with formaldehyde and ammonium chloride, followed by reduction with sodium borohydride) or a compound of formulas VIIa or VIIb with an aldehyde, such as, for example, benzaldehyde and quaternizing the resulting Schiff's base with a known methylating agent, such as, methyl chloride, dimethyl sulfate, methyl mesylate, methyl benzenesulfonate or the like; particularly preferred is methyl tosylate, at an elevated temperature. The compound of formula IX which is obtained can be utilized without further purification. Often, it is advantageous not to isolate it, but immediately to allow the reaction mixture to react with the aqueous acid at an elevated temperature as discussed above.

A further process of the invention comprises the reaction of a compound of formula X with a comound of formula XI to form the exocyclically saturated compounds of formula Ia. In formula X, the symbol T preferably is sodium, potassium or lithium. L in formula XI is preferably chlorine. In its significance as a substituted sulfonyloxy residue, L preferably is a lower (cyclo-) alkylsulfonyloxy residue, such as, mesyloxy or cyclopropylsulfonyloxy; the phenylsulfonyloxy residue; a lower alkylphenylsulfonyloxy residue, such as, tosyloxy; or a phenyl-(lower alkyl)-sulfonyloxy residue, such as phenylesyloxy. The reaction is conveniently carried out in an inert solvent such as benzene, toluene, hexane, heptane, ether or the like, at a temperature in the range of about the room temperature and the boiling point of the reaction mixture.

The starting compound of formula X can be obtained, for example, by the treatment of the corresponding 5-ketone or 5-hydroxy compound with aluminum isopropoxide, and subsequent reaction with an alkali-metal amide or hydride.

According to a still further process of the invention, compounds of general formula XII are hydrolytically cleaved to yield the corresponding secondary amines of formula Ia. The group D can be, for example, acyl, such as, a lower alkanoyl group, for example, formyl or acetyl; a phenyl-(lower alkanoyl), for example, benzoyl; a lower alkylsulfonyl, for example, mesyl; phenylsulfonyl; lower alkylphenylsulfonyl, for example, tosyl; or phenyl-(lower alkyl)-sulfonyl, for example, phenylmesyl. The group D, in its significance as an esterified carboxy group, preferably is lower carbalkoxy, for example, carbomethoxy, carbethoxy or carboisopropoxy; carbophenoxy; or lower carbophenylalkoxy, for example, carbobenzoxy. When D is a non-sulfur-containing group, the cleavage proceeds under the conditions which are employed for acidic or alkaline hydrolysis, for example, with heating, for example, at a temperature in the range of about 50°C. and the boiling point of the reaction mixture, in the presence of an ethanolic solution of hydrochloric acid, acetic acid, sodium hydroxide or potassium hydroxide. Alkaline hydrolysis is preferred. When D is a sulfur-containing group, it is preferred to conduct the cleavage by treatment with, for example, hydrobromic acid in acetic acid in the presence of phenol, an alkali-metal, such as sodium, and a high-boiling alcohol, such as, butanol or hydroiodic acid and phosphonium iodide. Such reactions are conveniently effected with heating, for example, at a temperature in the range of about 50°C. and boiling point of the reaction mixture. Another method for the cleavage of sulfur-containing group comprises treatment with liquid ammonia and an alkali-metal, such as, sodium.

The starting compound of formula XII can be obtained, for example, by heating a compound of formula X in ether with a methyl-D-aminopropyl halide, wherein D is as described above.

The compounds of formulas Ia and Ib, prepared as described above, can, if desired, be subjected to additional transformations.

A methylamino compound of formulas Ia or Ib can be transformed into a dimethylamino compound according to known methods, for example, by treatment with a methylating agent, such as methyl iodide, methyl mesylate, methyl tosylate, dimethylsulfate or the like, preferably at a temperature in the range of about 15°–75°C. According to another procedure, a mixture of formaldehyde and formic acid, preferably in excess, at an elevated temperature, for example, in the range of about 50°C. and the boiling point of the reaction mixture, is reacted with the methylamino compound of formulas Ia or Ib.

Dimethylamino compounds of formulas Ia and Ib can be transformed into the corresponding monomethylamino compounds. An especially suitable process for this transformation comprises reacting the dimethylamino compound of formulas Ia or Ib with a cyanogen halide, preferably with cyanogen bromide. The reaction is conveniently carried out in an inert solvent, such as, for example, benzene, ether, tetrahydrofuran, methylene chloride or the like, at a temperature between room temperature and the boiling point of the mixture. The resulting N-cyano-N-methylamino compound is subsequently hydrolyzed in a known manner in alkaline or acidic medium, whereby the monomethylamino compound of formulas Ia or Ib is formed as a base or acid addition salt, depending on the hydrolysis medium employed.

According to another process for the demethylation of dimethylamino compounds of formulas Ia or Ib, said compounds are treated with a haloformic acid ester and the resulting carbamate is hydrolyzed. The alcoholic portion of the haloformic acid ester to be employed is preferably derived from an alcohol, such as, a lower alkanol, for example, methanol, ethanol, or isopropanol; phenol; or a lower phenyl-alkanol, for example, benzyl alcohol. The halo portion preferably is chlorine. The reaction with the haloformic acid ester is conveniently effected in a high-boiling inert solvent, such as, xylene or toluene, at a temperature in the range of about 50°C. and the reflux temperature of the reaction mixture, preferably at reflux temperature. The subsequent hydrolysis can be carried out under alkaline or acidic conditions, for example, with potassium hydroxide in butanol or hydrogen bromide in glacial acetic, at a temperature in the range of about 50°C. and the boiling point of the reaction mixture.

Unsubstituted groups X, i.e. the ethylene group, X and the vinylene group X, can be converted into a halogen substituted vinylene group. By treatment with e.g. gaseous chlorine, preferably in an inert solvent such as carbon tetrachloride and with the application of light, two chlorine atoms are added to the unsubstituted vinylene group X. The temperature is not critical but is preferably kept between room temperature and the boiling point of the reaction mixture. The ethylene group X can be treated with an excess of a halogenating agent such as N-bromosuccinimide, N-chlorosuccinimide, bromine, chlorine or sulphuryl chloride, whereby two hydrogen atoms in 10,11-position are replaced by two halogen atoms. This reaction is preferably effected in an inert solvent such as carbon tetrachloride, benzene, heptane, chloroform or tetrahydrofuran and at elevated temperature, e.g. at 50°C to the boiling point of the reaction mixture. It is very advantageous to add a small amount of a reaction initiator such as azo-bisbutyronitrile or dibenzoyl peroxide, as well as a hydrogen halide acceptor, e.g. pyridine, triethylamine, collidine, allyl chloride or an epoxide. By treatment of a so-obtained 10,11-dihalogen-10,11-dihydro compound with an inorganic or organic base, for instance caustic soda, potassium carbonate or triethylamine, one molecule of hydrogen halide is split off yielding compounds of the formulas Ia or Ib with a halogen substituted vinylene group in 10,11-position. The temperature for this purpose is not critical but is preferably maintained between room temperature and the boiling point of the reaction mixture.

10,11-Dihydro compounds of the formulas Ia or Ib can be dehydrogenated in the 10,11-position. This is conveniently effected by heating e.g. at 150°–250°C with a catalyst such as palladium carbon, Raney-nickel or platinum dioxide, conveniently in an inert solvent such as, e.g. tetrahydronaphthalene or diethyleneglycol monomethyl ether.

According to another mode of dehydrogenation of 10,11-dihydro compounds of the formulas Ia or Ib there is proceeded as follows:

If a monomethylamino group is present, this is protected by the introduction of a protecting group. Now one or two halogen atoms are added in 10- and/or 11-position by means of halogenation. These halogen atoms can be split off with the formation of a 10,11- double bond as discussed below. After splitting off any protecting group present there is obtained an amine of the formulas Ia or Ib which is unsaturated in 10,11-position.

Representative examples of suitable protecting groups are: the cyanide group or an esterified carboxy group, such as, carbomethoxy, carbethoxy, carboisopropoxy, carbophenoxy and carbobenzoxy. The cyanide group is conveniently introduced through reaction with a cyanogen halide, preferably with cyanogen bromide, for example, in an inert solvent, such as benzene, ether, tetrahydrofuran or methylene chloride, at a temperature in the range of about room temperature and the boiling point of the reaction mixture. The introduction of the esterified carboxy group is effected, for example, through reaction with the corresponding haloformic acid ester, such as, the chloroformic acid ester. This reaction is preferably effected in an inert solvent, such as, for example, chloroform, xylene, toluene or the like, at a temperature in the range of about room temperature and the boiling point of the reaction mixture. When a monomethylamino compound of formulas Ia or Ib is employed for the introduction of the cyanide group or of an esterified carboxy group, it is recommended to add an acid-binding agent, such as triethylamine, pyridine or the like. The reaction then proceeds quickly, and often at room temperature.

Another protecting group which can be suitably introduced into a monomethylamino compound of formulas Ia or Ib is the acyl group derived from a lower carboxylic acid, such as, acetyl, isobutyryl, benzoyl, phenylacetyl or the like. The introduction of such a protecting group is effected, for example, by the reaction of a monomethylamino compound of formulas Ia or Ib with acetyl chloride or acetic anhydride, conveniently in the presence of an acid-binding agent, such as, triethylamine, pyridine or the like. The reaction can be effected at a temperature in the range of about room temperature and the reflux temperature of the reaction mixture; room temperature is often sufficient.

The 10,11-dihydro compound which may be protected at the nitrogen atom is subsequently treated with a halogenating agent, such as, N-bromosuccinimide, N-chlorosuccinimide, bromine, chlorine sulfuryl chloride or the like, whereby one or two hydrogen atoms are replaced by one or two halogen atoms in the 10- and/or 11-position, depending on the amount used of halogenating agent. The reaction is preferably effected in an inert solvent, such as, carbon tetrachloride, benzene, heptane, chloroform, tetrahydrofuran or the like at elevated temperatures in the range of about 50°C to the boiling point of the reaction mixture. Advantageously, a small amount of a reaction initiator, such as, azo-bis-butyronitrile or dibenzoyl peroxide, as well as a hydrogen halide acceptor, for example, pyridine, triethylamine, collidine, allyl chloride, an epoxide or the like can be added. A resulting 10,11-dihydro compound which is mono-halogenated in the 10- or 11-position is subsequently treated with a basic agent, such as sodium hydroxide, potassium carbonate, triethylamine, or the like, at a temperature in the range of about room temperature and the boiling point of the reaction mixture, whereby a 10,11-double bond is formed under cleavage of hydrogen halide. Resulting 10,11-dihalogen-10,11-dihydro compounds can be reacted with zinc in ether or dioxan. In this manner a 10,11-double bond is also obtained. A protecting group bound to the nitrogen atom is then hydrolytically cleaved in the manner described hereinbefore and there results and amine of the formulas Ia or Ib, which is unsaturated in 10,11-position.

Resulting unsymmetrically substituted compounds of the formulas Ia or Ib which carry an exocyclic double bond, as well their salts, can be separated into their geometric isomers i.e. $\alpha$- and $\beta$-isomers. The methods of separation are known per se. The geometric isomers are preferably separated by fractional crystallisation of the acid addition salts from a solvent, e.g. acetone, or from a solvent mixture, e.g. methanol/diethyl ether.

Resulting unsymmetrically substituted exocyclically saturated compounds of the formulas Ia or Ib, as well as their salts, are obtained as racemates. They can be separated into their optical isomers according to methods known per se, e.g. by the reaction with optically active acids such as tartaric acids or camphor sulfonic acid and subsequent crystallisation.

The invention also includes the acid addition salts of the tricyclic amines of formulas Ia and Ib. Such salts are, for example, those formed with pharmaceutically acceptable organic acids, such as oxalic acid, citric acid, acetic acid, lactic acid, maleic acid, tartaric acid or the like or with pharmaceutically acceptable inorganic acids, such as, hydrochloric acid, hydrobromic acid, sulfuric acid or the like.

The compounds of formulas Ia and Ib and their pharmaceutically acceptable acid addition salts possess psychopharmacological antidepressant activity and are therefore useful as psychopharmacological antidepressants. Moreover, the compounds of formulas Ia and Ib and their salts possess the advantage of being devoid of certain undesirable effects, for instance, they are substantially free of anticholinergic activity and have a very low toxicity. Additionally, the compounds of formulas Ia and Ib and their salts have demonstrated narcosis potentiating, adrenolytic, sedative, antihistaminic and local anesthetic activities. Their useful psychopharmacological antidepressant activity is demonstrated in warm-blooded animals utilizing standard procedures. For example, groups comprising 10 mice each are administered the test substance in variable amounts subcutaneously. After 16 hours, they are given subcutaneously 5 mg/kg of 2-hydroxy-2-ethyl-3-isobutyl-9,10-dimethoxy-1,2,3,4,6,7-hexahydro-11bH-benzyl[a]quninolizine (substance A), and 30 minutes thereafter, they are given intraperitoneally 3.75 mg/kg of ethanol. A control group of 10 animals is given only ethanol. The duration of sleep is measured in all animals. The percentage decrease in duration in sleep in comparison with the duration of the substance A potentiated sleep reflects the psychopharmcological antidepressant effect.

When 1-chloro-10,11-dihydro-5-(3-methylaminopropyl)-5H-dibenzo[a,d]cycloheptene, which has an $LD_{50}$ of 700 mg/kg p.o., is utilized as the test substance at dosages in the range of 5–20 mg/kg s.c., a corresponding 32–57% decrease in duration of sleep is produced.

When 1-chloro-5-(3-dimethylaminopropylidene)-5H-dibenzo[a,d]cycloheptene, which has an $LD_{50}$ of 350 mg/kg p.o., is utilized as the test substance at dosages in the range of 2.5–10 mg/kg s.c., a corresponding 48–81% decrease in duration of sleep is produced.

The substantial absence of the anticholingeric effect is demonstrated in rabbits. Pilocarpine is administered to urethane-narcotized rabbits and their saliva drippings are collected in a measuring cylinder over a period of 15 minutes. Immediately thereafter, they are given 1,3 or 6 mg/kg i.v. of the substance to be evaluated, and their saliva drippings are collected in a measuring cylinder over a period of 15 minutes. The saliva drippings of controls ar also collected over two successive periods of 15 minutes each. Teh anticholinergic effect is reported as the percent inhibition of salivation taken in relation to the saliva production before the administration of the test substance. When the 1-chloro-10,11-dihydro-5-(3-methylaminopropyl)-5H-dibenzo[a,d]cycloheptene is administered in the range of 1–6 mg/kg. i.v., a corresponding 5–19% inhibition of salivaiton is produced. This is much lower than the inhibition obtained with standard psychopharmacological antidepressants such as amitriptyline.

The compounds of formulas Ia and Ib and their pharmaceutically acceptable acid addition salts have effects qualitatively similar to those of amitriptyline, known for its therapeutic uses and properties. Thus, the compounds of this invention demonstrate a pattern of activity associated with psychopharmacological antidepressants of known efficacy and safety.

The compounds of formulas Ia and Ib can be used as medicaments, for example, in the form of pharmaceutical preparations which contain them or their salts in admixture with a pharmaceutical, organic or inorganic inert carrier material suited for enteral or parenteral application, such as, for example, water, gelatin, lactose, starch, magnesium stearate, talc, vegetable oils, gums, polyalkyleneglycols, and the like. The pharamaceutical preparations cna be in solid form, for example, tablets, dragees, suppositories, capsules, or in liquid form, for example, as solutions parenteral solutions, suspensions or emulsions. They may be sterilized and may contain additives, such as preserving, stabilizing, wetting or emulsifying agents, salts for varying the osmotic pressure or buffers. They may also contain other therapeutically valuable substances.

A suitable pharmaceutical dosage unit contains from about 1 to 50 mg. of a compound of formula Ia or Ib. Suitable oral dosage regimens in warm-blooded mammals falls within the range of from about 0.1 mg/kg per day to about 50 mg/kg per day. Suitable parenteral dosage regimens in warm-blooded mammals falls within the range of from about 0.01 mg/kg per day to about 10 mg/kg per day. However, for any particular subject, the specific dosage regimen should be adjusted according to individual need and the professional judgement of the person administering or supervising the administration of a compound of formula Ia or Ib.

The following non-limiting examples further illustrate the invention. All parts are by weight and all temperatures are in degrees centigrade, unless otherwise mentioned.

EXAMPLE 1

Preparation of 1-chloro-10,11-dihydro-5-(3-dimethylaminopropyl)-5H-dibenzo[a,d]cycloheptene 500 g. of 1-chloro-10,11-dihydro-5-(3-dimethylaminopropyl)-5-hydroxy-5H-dibenzo[a,d]cycloheptene, 437 g. of red phosphorus, 4,000 ml. of glacial acetic and 2,160 ml. of 57% hydroiodic acid are heated under reflux conditions in an atmosphere of argon for 3 hours. The resulting suspension is filtered. The filtrate is washed wth 2,000 ml. of boiling water and subsequently cooled to 20°. The crystals which form are separated by decantation and the mother liquor is concentrated under reduced pressure. The combined residues are suspended in 15,000 ml. of water. THe suspension is cooled with ice and, with stirring, adjusted to pH 10–12 with concentrated caustic soda. The solution is extracted with 4,000 ml. of methylene chloride. The resulting organic phase is successively washed with saturated sodium chloride solution and sodium thiosulfate solution, dried with sodium sulfate evaporated under reduced pressure. The residue is dissolved in 2,000 ml. of ether. The etheral solution is filtered, and the filtrate is evaporated to yield yellow, oily 1-chloro- 10,11-dihydro-5-(3-dimethylaminopropyl)-5H-dibenzo[a,d]cycloheptene. The hydrochloride of this compound crystallizers from acetone/ether and has a melting point of 149°–153°.

The 1-chloro-10,11-dihydro-5-(3-dimethylaminopropyl)-5-hydroxy-5H-dibenzo[a,d]cycloheptene employed as starting material can be prepared as follows:

86.6 g. of Gilman alloy or magnesium turnings are heated under reflux conditions in 800 ml. of absolute ether with a trace of iodine. Subsequently, a solution of 390 g. of dimethylaminopropyl chloride in 500 ml. of absolute tetrahydrofuran is added dropwise over a period of 2 hours. The resulting mixture is heated under reflux conditions for an additonal 3 hours. To the suspension obtained previously cooled to 15°C., there is added dropwise over a period of 15 minutes a solution of 242.7 g of 1-chloro-10,11-dihydro-5H-dibenzo[a,d-]cyclohepten-5-one in 500 ml. of absolute tetrahydrofuran, and the resulting mixture is heated under reflux conditions for 12 hours. Thereafter, the reaction mixture is cooled to 15°, hydrolyzed with 500 ml. of saturated ammonium chloride solution, filtered, and rinsed with methylene chloride. The filtrate is dried with sodium sulfate and evaporated under reduced pressure. The residual yellow substance is recrystallized from 6000 ml. of high-boiling petroleum ether to yield 1-chloro-10,11-dihydro-5 -(3-dimethylaminopropyl)-5-hdyroxy-5H-dibenzo[a,d]cycloheptene, having a melting point of 131°–132°.

EXAMPLE 2

Preparation of the α and β isomers of 1-chloro-10,11-dihydro-5-(3-dimethylaminopropylidene-5H-dibenzo[a,d]hydrochloride 10 g. of 1-chloro-10,11-dihydro-5-(3-dimethylaminopropyl)-5-hydroxy-5H-dibenzo[a,d]cycloheptene are heated under reflux conditions for 1 hour with 50 ml. of ethanol and 11 ml. of 30% ethanolic hydrochloric acid. Thereafter, the mixture is evaporated under reduced pressure and recrystallized from methanol/ether to yield 1-chloro-10,11-dihydro-5-(3-dimethylaminopropylidene)-5H-dibenzo[a,d]cycloheptene hydrochloride, having a melting point of 208°–210°. This compound represents a mixture of the two geometric isomers α+β in the proportion of 1:1. The isomeric mixture is recrystallized from methanol/ether to yield the β-isomer which has a melting point of 222°–225°. The α-isomer crystallizes out from the mother liquour and has a melting point of 202°–206°.

EXAMPLE 3

Preparation of 1-chloro-5-(3- dimethylaminopropylidene)-5H-dibenzo[a,d]cycloheptene hydrochoride 10 g. of 1-chloro-5-(3-dimethylaminopropyl)-5-hydroxy-5H-dibenzo[a,d]cycloheptene are heated under reflux conditions for 1 hour in 50 ml. of absolute ethanol and 11 ml. of 30% ethanolic hydrochloric acid. The mixture is evaporated under reduced pressure, taken up in water, washed with either and made alkaline with 2N sodium hydroxide solution. This solution is shaken out with methylene chloride. The resulting organic phase is washed with water, dried with sodium sulfate and evaporated to yield 1-chloro-5-(3-dimethylaminopropylidene)-5H-dibenzo[a,d]cycloheptene hydrochloride as a viscous oil, having a metling point of 193°–194°. This compound represents a mixture of the α and β isomers in the proportion of about 1:1.

The enrichment of the β-isomer can be effected by recrystallizatin of the said hydrochloride from methanol/ether. A product containing 75% β-isomer has a melting point of 212°–219°, while a 94% product has a melting point of 216°–221°. The β-isomer is produced from the mother liquor as a 97.8% product having a melting point of 99°–110°.

The 1-chloro-5-(3-dimethylaminopropyl)-5-hydroxy-5H-dibenzo[a,d]cycloheptene employed as starting material can be prepared as follows:

17 g. of magnesium and 85 g. dimethylaminopropyl chloride are reacted utilizing the procedure of Example 1. The resulting Grignard compound is then treated with a solution of 52 g. of 1-chloro-5H-dibenzo[a,d]cyclohepten-5-one in 500 ml. of absolute tetrahdrofuran. Utilizing the work-up procedure of Example 1, there is obtained 1-chloro-5-(3-dimethylaminopropyl)-5-hydroxy-5H-dibenzo[a,d]cycloheptene, having a melting point of 134°–136°. The hydrochloride prepared therefrom has a melting point of 226°–227°, after recrystallization from methanol/ether.

EXAMPLE 4

Preparation of 1-chloro-10,11-dihydro-5-(3-methylaminopropylidiene)-5H-dibenzocyclo[a,d]heptene hydrochloride A mixture of 20 g. of 1-chloro-10,11-dihydro-5-(3-chloropropylidene)-5H-dibenzo[a,d]cycloheptene, 80 ml. of absolute methanol and 30 g. of methylamine is heated in an autoclave for 12 hours at 120° under a nitrogen pressure of 6 atmospheres. Subsequently, the solution is evaporated under reduced pressure and the resulting yellow, oily residue is treated with methanolic hydrochloric acid, whereby 1-chloro-10,11-dihydro-5-(3-methylaminopropylidene)-5H-dibenzocyclo[a,d]heptene hydrochoride separates out. After recrystallization from methanol/ether, this compound has a melting point of 209°–210°, and comprises a mixture of the α- and β-isomers in the proportion of about 3:2.

The 1-chloro-10,11-dihydro-5-(3-chloropropylidene)-5H-dibenzo[a,d]cycloheptene used as starting material can be prepared as follows:

To 14 g. of Gilman alloy in 100 ml. of absolute ether, after the addition of a trace of iodine or methyl iodide, there is added dropwise a solution of 45.6 g. of 1-chloro-3-methoxypropane in 300 ml. of absolute ether over a period of 30 minutes under reflux conditions. The reaction mixture is heated for an additional 3 hours. After cooling to 20°, a solution of 48.5 g. of 1-chloro-10,11-dihydro-5H-dibenzo[a,d]cyclohepten-5-one in 160 ml. of tetrahydrofuran is added over a period of 30 minutes. This reaction mixture, after being heated under reflux conditions for 12 hours, is hydrolyzed with 150 ml. of saturated ammonium chloride solution with cooling, filtered, rinsed with chloroform, dried with sodium sulfate and evaporated. The 1-chloro-10,11-dihydro-5-(3-methoxypropyl)-5-hydroxy-5H-dibenzo[a,d]cycloheptene obtained has a melting point of 80°–81°, after recrystallization from ether/petroleum ether. 53.3 g. of 1-chloro-10,11-dihydro-5-(3-methoxypropyl)-5-hydroxy-5H-dibenzo[a,d]cyloheptene are heated under reflux conditions for 1 hour in 250 ml. of methanol and 53 ml. of 30% methanolic hydrochloric acid. Thereafter, the mixture is evaporated under reduced pressure, taken up in ether, washed with water, dried with sodium sulfate and reevaporated to yield 1-chloro-10,11-dihydro-5-(3-methoxypropylidene)-5H-dibenzo[a,d]cycloheptene as a yellow oil.

48.5 g. of 1-chloro-10,11-dihydro-5-(3-methoxypropylidene)-5H-dibenzo[a,d]cycloheptene are dissolved in 150 ml. of methylene chloride. The resulting solution is cooled to 10° and treated over a period of 15 minutes with a solution of 30 g. of boron trichloride in 150 ml. of methylene chloride. The reaction mixture is stirred at room temperature for 19 hours, and thereafter it is poured on ice-water, extracted with methylene chloride, washed with water and dried over sodium sulfate. After evaporation, there is obtained 1-chloro-10,11-dihydro-5-(3-chloropropylidene)-5H-dibenzo[a,d]cycloheptene as a yellow-orange oil which slowly crystallizes out and has a melting point of 51°–53°.

EXAMPLE 5

Preparation of 1-chloro-5-(3-methylaminopropylidene)-5H-dibenzo[a,d]cycloheptene hydrochloride If the 1-chloro-10,11-dihydro-5-(3-chloropropylidene)-5H-dibenzo[a,d]cycloheptene of Example 4 is replaced by a 1-chloro-5-(3-chloropropylidene)-5H-dibenzo[a,d]cycloheptene, under otherwise similar conditions, there is obtianed 1-chloro-5-(3-methylaminopropylidene-5H-dibenzo[a,d]cycloheptene hydrochlroide. A mixture of the two α- and β-isomers of this compound has a melting point of 208°–216°.

The 1-chloro-5-(3-chloropropylidene)-5H-dibenzo[a,d]cycloheptene employed as starting material for this reaction can be prepared as follows;

To 10.5 g. of Gilman alloy in 100 ml. of absolute ether, after the addition of a trace of iodine and 1–3 drops of methyl iodide, there is added dropwise a solution of 34.1 g. of 1-chloro-3-methoxypropane in 300 ml. of absolute ether over a period of 30 minutes under reflux conditions. After the addition of 150 ml. of tetrahdyrofuran, the reaction mixture is heated for an additional 3 hours. Thereafter, it is cooled to 20° and a solution of 36 g. of 1-chloro-5H-dibenzo[a,d]cyclohepten-5-one in 300 ml. of tetrahydrofuran is added over a period of 15 minutes. This reaction mixture, after being heated under reflux conditions for 15 hours, is hydrolyzed with 150 ml. of saturated ammonium chloride solution with cooling, filtered, dried with sodium sulfate and evaporated under reduced pressure to yield 1-chloro-5-(3-methoxypropyl)-5-hydroxy-5H-dibenzo[a,d]cycloheptene as a yellow, viscous oil.

50 g. of 1-chloro-5(3-methosypropyl)-5-hydroxy-5H-dibenzo[a,d]cycloheptane are dissolved in 250 ml. of absolute methanol, heated under reflux conditions for 1 hour with 50 ml. of 30% methanolic hydrochloric acid, and subsequently concentrated under reduced pressure. The residue is taken up in ether, washed with water, dried with sodium sulfate and evaporated to yield 1-chloro-5-(3-methoxypropylidene)-5H-dibenzo[a,d]cycloheptene as a red oil.

42.8 g. of 1-chloro-5-(3-methoxypropylidene)-5H-dibenzo[a,d]cycloheptene are cooled to −10° in 150 ml. of methylene chloride. A solution of 26.7 g. of boron trichloride in 150 ml. of methylene chloride is then added dropwise over a period of 15 minutes. The reaction mixture is stirred at room temperature for 19 hours. Subsequently, the mixture is poured on ice-water, extracted with methylene chloride, washed with water and dried with sodium sulfate. The residue is taken up in benzene and purified by filtration with 300 g. of silica gel to yield 1-chloro-5-(3-chloropropylidene)-5H-dibenzo[a,d]cycloheptene as a red oil which, after crystallization from petroleum ether, has a melting point of 53°–60°.

EXAMPLE 6

Preparation of 1-chloro-5-(3-dimethylaminopropyl)-5H-dibenzo[a,d]cycloheptene 5.6 g. of magnesium turnings are suspended in 100 ml. of absolute tetrahydrofuran and treated with a trace of iodine and methyliodide. To this mixture there is added dropwise a solution of 26 g. of dimethylaminopropyl chloride in 100 ml. of tetrahydrofuran over a period of about 20 minutes under reflux conditions. The mixture is boiled for an additional 3 hours. After cooling the mixture to 20°, a solution of 25.2 g. of 1,5-dichloro-5H-dibenzo[a,d]cycloheptene in 250 ml. of tetrahydrofuran is added dropwise over a period of 15 minutes. The mixture is subsequently heated under reflux conditions for 15 hours, cooled and hydrolyzed with 200 ml. of saturated ammonium chloride solution. The resulting mixture is filtered and rinsed with methylene chloride. The filtrate is dried with sodium sulfate and evaporated under reduced pressure to yield 1-chloro-5-(3-dimethylaminopropyl)-5H-dibenzo[a,d-]cycloheptene as a viscous oil which has a boiling point of about 160°/0.01 mm.

EXAMPLE 7

Preparation of 1-chloro-10,11-dihydro-5-(3-methylaminopropyl)-5H-dibenzo[a,d]cycloheptene hydrochloride A solution of 102.5 g. of 1-chloro-10,11-dihydro-5-(3-dimethylaminopropyl)-5H-dibenzo[a,d]cycloheptene in 500 ml. of methylene chloride is added dropwise to a solution of 55 g. of cyanogen bromide in 500 ml. of methylene chloride. The reaction mixture is stirred at room temperature for 12 hours and subsequently poured on ice-water. The methylene chloride phase is washed with 2N hydrochloric acid and water, dried with sodium sulfate and evaporated under reduced pressure. The residue obtained is a yellow oil which is crystallized from ether to yield 1-chloro-10,11-dihydro-5-(3-N-cyano-N-methylaminopropyl)-5H-dibenzo[a,d]cycloheptene, having a melting point of 69°–71°. After being dissolved in benzene/ether, this compound can be chromatographically purified on 500 g. of silica gel.

A mixture of 650 g. of 1-chloro-10,11-dihydro-5-(3-N-cyano-N-methylaminopropyl)-5H-dibenzo[a,d]cycloheptene, 4,000 ml. of glacial acetic, 2,000 ml. of water and 1,000 ml. of concentrated hydrochloric acid are heated under reflux conditions for 24 hours. The reaction mixture is concentrated under reduced pressure, diluted with 20,000 ml. of ice-cold water and washed with 5,000 ml. of methylene chloride. The mixture is made alkaline with a concentrated sodium hydroxide solution and the resulting precipitation is taken up in methylene chloride. Following concentration of the methylene chloride solution, there is obtained a brown-red oil which is converted into the crystalline 1-chloro-10,11-dihydro-5-(3-methylaminopropyl)-5H-dibenzocyclo[a,d]heptene hydrochloride by addition of methanolic hydrochloric acid. After recrystallization from methanol/ether, this crystalline compound has a melting point of 168°–169°.

EXAMPLE 8

Preparation of 1-chloro-5-(3-methylaminopropylidene)-5H-dibenzo [a,d]cycloheptene A solution of 5.4 g. of 1-chloro-5-(3-dimethylaminopropylidene)-5H-dibenzo[a,d]cycloheptene hydrochloride is added dropwise to a solution of 2.1 g. of cyanogen bromide in 20 ml. of methylene chloride. The reaction mixture is stirred at room temperature for 20 hours and subsequently washed with water, 2N hydrochloric acid and water, dried with sodium sulfate and evaporated to yield 1-chloro-5-(3-N-cyano-N-methylaminopropylidene)-5H-dibenzo[a,d]cycloheptene as a yellow oil which is dissolved in benzene and chromatographically purified on 50 g. of silica gel.

A mixture of 4.4 g. of 1-chloro-5-(3-N-cyano-N-methylaminopropylidene)-5H-dibenzo[a,d]cycloheptene, 40 ml. of glacial acetic, 24 ml. of water and 8 ml. of concentrated hydrochloric acid are heated under reflux conditions for 24 hours. The reaction mixture is worked up according to the procedure of Example 3 to yield 1-chloro-5-(3-methylaminopropylidene)-5H-dibenzo[a,d]cycloheptene as a red oil. The corresponding hydrochloride salt has a melting point of 208°–216° and comprises a mixture of the α- and β-isomers. Through recrystallization from methanol/ether, there is obtained the α-isomer, which has a melting point of 218°–224°.

EXAMPLE 9

Preparation of 1-fluoro-10,11-dihydro-5-(3-dimethylaminopropylidene)-5H-dibenzo[a,d]cycloheptene 15 g. of 1-fluoro-10,11-dihydro-5-(3-dimethylaminopropyl)-5-hydroxy-5-H-dibenzo[a,d]cycloheptene are heated under reflux conditions for 2 hours with 100 ml. of absolute ethanol and 12 ml. of 30% ethanolic hydrochloric acid. The resulting reaction mixture is evaporated under reduced pressure, and is worked up in the manner set forth in Example 1 to yield 1-fluoro-10,11-dihydro-5-(3-dimethylaminopropylidene)-5H-dibenzo[a,d] cycloheptene, the hydrochloride of which has a melting point of 187°–200° after recrystallization from methanol/ether. The compound comprises a mixture of the α- and β-isomers.

The 1-fluoro-10,11-dihydro-5-(3-dimethylaminopropyl)-5-hydroxy-5H-dibenzo[a,d]cycloheptene employed as starting material can be prepared as follows:

14.8 g of pulverised phthalic anhydride, 18.5 g of orthofluorophenyl acetic acid and 0.5 g of freshly melted sodium acetate are heated for 3 hours at 235°–240°C and the resulting water is distilled off. The hot reaction mixture is transfered into a mortar and pulverised. The crude product is recrystallised from acetone/petroleum ether. There is obtained ortho-fluorobenzylidene phthalide, which melts at 148°–151°C.

72.6 g of ortho-fluorobenzylidene phthalide are heated in an argon atmosphere for 24 hours under reflux conditions together with 55.0 g of red phosphorus and 450 ml of hydroiodic acid (density 1.75). The reaction mixture is cooled, supplied with 500 ml of water and filtered. The residue is heated with 2N caustic soda to 80°C and again filtered to remove the phosphorus. The alkaline solution is acidified and extracted with methylene chloride, washed with water, dried and evaporated to dryness. The crude product obtained is recrystallised from acetone/low boiling petroleum ether. 2-(ortho-Fluorophenethyl)-benzoic acid is obtained as white crystals melting at 93°–94°C.

280 g of poly-phosphoric acid are heated to 120°C and, in an atmosphere of argon, 70.0 g of 2-(ortho-fluorophenethyl)-benzoic acid are added. The heating is continued over a 3 hour period at 150°C, the reaction mixture is poured over ice water and extracted with ether. The ether extract is washed with water, 2N caustic soda and again with water until neutral, dried over sodium sulphate, filtered and evaporated to dryness. The residual crude product is distilled under reduced pressure. There is obtained 1-fluoro-10,11-dihydro-5H-dibenzo[a,d]cycloheptene-5-one as a yellow oil which crystallises upon standing, m.p. 64°–65°C.

19.1 g. of Gilman alloy and a trace of iodine are suspended in 150 ml. of absolute ether, and are reacted with 88 g. of dimethylaminopropyl chloride in 200 ml. of tetrahydrofuran as in Example 1. To the resulting suspension there is added dropwise at 20° a solution of 50 g. of 1-fluoro-10,11-dihydro-5H-dibenzo [a,d]cyclohepten-5-one in 250 ml. of tetrahydrofuran over a 1-hour period. The reaction mixture is heated under reflux conditions for 15 hours and, after cooling, is hydrolyzed with saturated ammonium chloride solution. The resulting reaction mixture is filtered, rinsed with methylene chloride, dried with sodium sulfate and evaporated under reduced pressure to yield 1-fluoro-10,11-dihydro-5-(3-dimethylaminopropyl)-5-hydroxy-5H-dibenzo[a,d]cycloheptene which, after crystallization from high-boiling petroleum ether, has a melting point of 115°–117°.

EXAMPLE 10

Preparation of 1-fluoro-10,11-dihydro-5-(3-dimethylaminopropyl)-5H-dibenzo[a,d]cycloheptene 15 g. of 1-fluoro-10,11-dihydro-5-(3-dimethylaminopropyl)-5-hydroxy-5H-dibenzo[a,d]cycloheptene are heated under reflux conditions for 3 hours in an atmosphere of argon with 14 g. of red phosphorus, 250 g. of glacial acetic and 70 ml. of 57% hydroiodic acid. Thereafter, the mixture is filtered hot and the filtrate is concentrated under reduced pressure. The residue is treated with 2N sodium hydroxide solution and is taken up in methylene chloride. The greenish oil which forms is then purified by chromatography in benzene solution on the 20-fold amount of aluminum oxide to yield 1-fluoro-10,11-dihydro-5-(3-dimethylaminopropyl)-5H-dibenzo[a,d]cycloheptene, the hydrochloride of which has a melting point of 169°–170°, after recrystallization from methanol/ether.

EXAMPLE 11

Preparation of the α- and β-isomers of 1-chloro-10 (or 11)-bromo-5-(3-dimethylaminopropylidene)-5H-dibenzo[a,d]cycloheptene hydrochloride 11.9 g. of 1-chloro-10 (or 11)-bromo-5-(3-dimethylaminopropyl)-5-hydroxy-5H-dibenzo[a,d]cycloheptene are heated under reflux conditions for 15 hours in 100 ml. of 32% ethanolic hydrochloric acid. The reaction mixture is concentrated under reduced pressure, whereby there is obtained a mixture consisting of the α and β-isomers of 1-chloro-10 (or 11)-bromo-5-(3-dimethylaminopropylidene)-5H-dibenzo[a,d]cycloheptene hydrochloride. This mixture is dissolved in water, made alkaline by the addition of 2N sodium hydroxide solution and extracted with chloroform. The chloroform extract is dried with sodium sulfate, filtered and evaporated. The resulting residue is dissolved in benzene and filtered on the 30-fold amount of aluminum oxide (activity grade II). The filtrate is evaporated, acidified with methanolic hydrochloric acid and reevaporated. The residue is treated with acetone, whereby 1-chloro-10 (or 11)-bromo-5-(3-dimethylaminopropylidene)-5H-dibenzo[a,d]cycloheptene hydrochloride which has a melting point of 221°–224° and consists of 96.5% α-isomer and 3.5% β-isomer which crystallizes out. The β-isomer can be obtained from the mother liquor.

The 1-chloro-10 (or 11)-bromo-5-(3-dimethylaminopropyl)-5-hydroxy-5H-dibenzo[a,d]cycloheptene employed as starting material can be prepared as follows:

21.3 g. of 1-chloro-5H-dibenzo[a,d]cyclohepten-5-one are suspended in 200 ml. of carbon tetrachloride. The resulting mixture is treated over a period of about 45 minutes with a solution of 14 g. of bromine in 40 ml. of carbon tetrachloride. At the same time, the reaction mixture is irradiated with a 500 W lamp. After complete addition, the reaction mixture is irradiated for an additional 30 minutes. Subsequently, it is stirred for 12 hours and then filtered. The recovered fine precipitate is washed with petroleum ether and dried under reduced pressure. The 1-chloro-10,11-dibromo-10,11-dihydro-5H-dibenzo[a,d]cyclohepten-5-one obtained (which melts at 169°–170° with decomposition) is immediately suspended in 300 ml of ethanol, treated with a solution of 5.5 g of potassium hydroxide in 10 ml of water and heated under reflux conditions for 4 hours. The reaction mixture is evaporated to dryness under reduced pressure, taken up in ether, washed with water and dried with sodium sulfate. The dried ethereal solution is concentrated to 500 ml. to yield crystalline 1-chloro-10 (or 11)-bromo-5H-dibenzo[a,d]cyclohepten-5-one, having a melting point of 125°–127°, after recrystallization from ethanol.

2.76 g. of Gilman alloy are heated in 10 ml. of absolute ether with a trace of iodine and a few drops of methyl iodide. A solution of 10.5 g. of dimethylaminopropyl chloride in 50 ml. of absolute tetrahydrofuran is added dropwise over a period of 1 hour. The resulting mixture is heated under reflux conditions for 1 hour. To the suspension obtained previously cooled to 0°–5°, there is added dropwise over a period of 40 minutes a solution of 17.3 g. of 1-chloro-10 (or 11)-bromo-5H-dibenzo[a,d]cyclohepten-5-one in 100 ml. of absolute tetrahydrofuran. This mixture is heated under reflux conditions for 3 hours. Thereafter, the reaction mixture is hydrolyzed with 20 ml. of saturated ammonium chloride solution with cooling and is filtered. The residue is rinsed with ether. The combined filtrates are dried with sodium sulfate and evaporated to yield 1-chloro-10 (or 11)-bromo-5-(3-dimethylaminopropyl)-5-hydroxy-5H-dibenzo[a,d]cycloheptene, having a melting point of 117°–118°, after recrystallization from 150 ml. of high-boiling petroleum ether.

EXAMPLE 12

Preparation of the α- and β-isomers of 1,10 (or 11)-dichloro-5-(3-dimethylaminopropylidene)-5H-dibenzo[a,d]cycloheptene hydrochloride 25 g. of 1,10 (or 11)-dichloro-5-(3-dimethylaminopropyl)-5-hydroxy-5H-dibenzo[a,d]cycloheptene are heated under reflux conditions for 15 hours with 100 ml. of absolute ethanol and 150 ml. of 30% ethanolic hydrochloric acid. The reaction mixture is concentrated under reduced pressure. The residue is dissolved in water, made alkaline with 2N sodium hydroxide solution and extracted with methylene chloride. The methylene chloride extract is washed with water, dried with sodium sulfate and evaporated to yield 1,10 (or 11)-dichloro-5-(3-dimethylaminopropylidene)-5H-dibenzo[a,d]cycloheptene as a yellow oil. For purification, this oil is taken up in benzene and filtered on 200 g. of aluminum oxide. The product obtained represents a mixture of the α- and β-isomers in the proportion of about 1:1. By conversion of this product into the corresponding hydrochloride and recrystallization from acetone, there first separates out a product having a melting point of 222°–224°, which comprises 94% of the α-isomer and 6% of the β-isomer of 1,10 (or 11)-dichloro-5-(3-dimethylaminopropylidene)-5H-dibenzo[a,d]cycloheptene hydrochloride. From the mother liquor there is obtained a product having a melting point of 132°–140° and which consists of 17% α-isomer and 83% β-isomer. A further enrichment of the β-isomer is possible by repeated crystallizations.

The 1,10 (or 11)-dichloro-5-(3-dimethylaminopropyl)-5-hydroxy-5H-dibenzo[a,d]cycloheptene employed as starting material can be prepared as follows:

51.6 g. of 1-chloro-5H-dibenzo[a,d]cyclohepten-5-one are dissolved in 300 ml. of carbon tetrachloride. With heating at about 60° and irradiation with a 500 W lamp, an 18% (weight for volume) solution of chlorine in carbon tetrachloride is added dropwise over a period of 10 minutes. The reaction mixture is irradiated for an additional 10 minutes and subsequently cooled. The 1,10,11-trichloro-10,11-dihydro-5H-dibenzo[a,d]cyclohepten-5-one which crystallizes out is removed by filtration, dried, immediately dissolved in 760 ml. of ethanol and treated with 33 g. of potassium carbonate and 30 ml. of water. This mixture is heated under reflux conditions for 8 hours. The crystals which separate out on cooling are removed by filtration and taken up in chloroform. The chloroform solution is washed with water, dried, filtered and evaporated. After recrystallization from ethanol, the residue yields 1,10 (or 11)-dichloro-5H-dibenzo[a,d]cyclohepten-5-one as long needles having a melting point of 143°–145°.

6.04 g. of Gilman alloy are heated in 20 ml. of absolute ether with a trace of iodine and a drop of methyl iodide and a solution of 21.9 g. of dimethylaminopropyl chloride in 100 ml. of absolute tetrahydrofuran is subsequently slowly added dropwise. The reaction mixture is heated at 50° for 2 hours. After cooling to 0°, a solution of 33 g. of 1,10 (or 11)-dichloro-5H-dibenzo[a,d]cyclohepten-5-one in 200 ml. of absolute tetrahydrofuran is added dropwise over a period of 15 minutes. This reaction mixture is heated under reflux conditions for 3 hours, cooled to 0°, treated with 100 ml. of a cold saturated ammonium chloride solution and filtered. The residue is rinsed with ether. The combined filtrates are dried with sodium sulfate, filtered and evaporated under reduced pressure. After recrystallization from high-boiling petroleum ether, the residue yields 1,10 (or 11)-dichloro-5-(3-dimethylaminopropyl)-5-hydroxy-5H-dibenzo[a,d]cycloheptene, having a melting point of 92°–94°.

EXAMPLE 13

Preparation of the α- and β-isomers of 1,3-dichloro-10,11-dihydro-5-(3-dimethylaminopropylidene)-5H-dibenzo[a,d]cycloheptene hydrochloride 25 g. of 1,3-dichloro-10,11-dihydro-5-(3-dimethylaminopropyl)-5-hydroxy-5H-dibenzo[a,d]cycloheptene are heated with 250 ml. of 30% ethanolic hydrochloric acid under reflux conditions over a 15-hour period. After evaporation under reduced pressure, the reaction mixture is dissolved in water, washed with ether and made alkaline with dilute sodium hydroxide solution. After extraction by shaking with ether and evaporation to dryness, the remaining oily mixtures of the isomers of 1,3-dichloro-10,11-dihydro-5-(3-dimethylaminopropylidene)-5H-dibenzo[a,d]cycloheptene by treatment with a methanolic hydrochloric acid is converted to the hydrochloride. Following the recrystallization from acetone, the hydrochloride of the α-isomer precipitates, which has a melting point of 231°–233°. From the mother liquors one obtains through crystallization from methanol/ether a product which is 94% of the hydrochloride of the β-isomer, having a melting point of 180°–183°.

The starting material 1,3-dichloro-10,11-dihydro-5-(3-dimethylaminopropyl)-5-hydroxy-5H-dibenzo[a,d]cycloheptene can be prepared as follows:

50 g. of 2-(2,4-dichlorophenethyl)-benzoate and 100 ml. of thionylchloride are heated together under reflux conditions over a 4-hour period. Following concentration under reduced pressure, the resulting acid chloride is dissolved in 500 ml. of carbon disulfide and is added dropwise to a boiling suspension of 70 g. of aluminum chloride in 1.1 carbon disulfide. After boiling for 4 hours, the reaction mixture is evaporated under reduced pressure, hydrolyzed with ice and extracted with ether, with water and 2N sodium hydroxide solution, and washed with water, dried and evaporated. The crude 1,3-dichloro-10,11-dihydro-5H-dibenzo[a,d]cyclohepten-5-one is separated by chromatography on 300 g. of silica gel in benzene. The product has a melting point of 108°–110°. Through the utilization of 2.9 g. of Gilman alloy, 13.5 g. of dimethylaminopropyl chloride and 18 g. of 1,3-dichloro-10,11-dihydro-5H-dibenzo[a,d]cyclohepten-5-one, in accordance with the procedure set forth in Example 1, there is obtained 1,3-dichloro-10,11-dihydro-5-(3-dimethylaminopropyl)-5-hydroxy-5H-dibenzo[a,d]cycloheptene, which is then immediately reacted further.

EXAMPLE 14

Preparation of 1,3-dichloro-10,11-dihydro-5-(3-dimethylaminopropyl)-5H-dibenzo[a,d]cycloheptene hydrochloride 23.5 g. of 1,3-dichloro-10,11-dihydro-5-(3-dimethylaminopropyl)-5H-hydroxy-5H-dibenzo[a,d-]cycloheptene are mixed with 19 g. of red phosphorus, 320 ml. of glacial acetic acid and 100 ml. of hydroiodic acid (having a specific gravity of 1.75), and the reaction mixture is heated for 4 hours at 115° in an atmosphere of argon. Whereupon, the reaction mixture is filtered hot. While cooling, the hydroiodide of 1,3-dichloro-10,11-dihydro-5-(3-dimethylaminopropyl)-5H-dibenzo[a,d]cycloheptene separates out and is taken up in water. Through the addition of 2N sodium hydroxide solution, the base separates out and is taken up in methylene chloride. And, after washing with water, is dried with sodium sulfate, filtered and evaporated. The residue is a yellow oil, which through the addition of ethanolic hydrochloric acid and ether separates out as the crystalline hydrochloride of 1,3-dichloro-10,11-dihydro-5-(3-dimethylaminopropyl)-5H-dibenzo[a,d]cycloheptene. The product is hygroscopic and melts at 168°–169°.

EXAMPLE 15

Preparation of 1,9-dichloro-10,11-dihydro-5-(3-dimethylaminopropylidene)-5H-dibenzo[a,d]cycloheptene 4.1 g. of 1,9-dichloro-10,11-dihydro-5-(3-dimethylaminopropyl)-5-hydroxy-5H-dibenzo[a,d]cycloheptene are heated in 100 ml. of 30% ethanolic hydrochloric acid under reflux conditions for 2 hours. After evaporation under reduced pressure, the residue is dissolved in water, washed with ether and made alkaline with sodium hydroxide solution and taken up in ether. Following evaporation of the ethereal residue, the oily 1,9-dichloro-10,11-dihydro-5-(3-dimethylaminopropylidene)-5H-dibenzo[a,d]cycloheptene is dissolved in benzene, purified by filtration with 50 g. of aluminum oxide and converted to the hydrochloride which after recrystallization from methanol/ether has a melting point of 234°–235°.

The starting material 1,9-dichloro-10,11-dihydro-5-(3-dimethylaminopropyl)-5-hydroxy-5H-dibenzo[a,d]cycloheptene can be prepared as follows:

18.2 g. of 3-chloro-phthalic anhydride and 20.5 g. of (2-chlorophenyl) acetic acid are melted with 0.5 g. of sodium acetate. The molten mass is poured into 120 ml. of ethanol withh stirring, cooled and filtered. The resulting mixture of the isomers 4-chloro-3-(2-chlorobenzylidene)-phthalide (A) and 7-chloro-3-(2-chlorobenzylidene)-phthalide (B) has a melting point of 159°–190°. The separation of the isomers is accomplished through recrystallization from acetone. The desired isomer (A) precipitates in over 96% purity and has a melting point of 204–209°. 53 g. of the resulting isomer (A) in 300 ml. of hydroiodic acid of specific gravity 1.75 are heated together with 40 g. of red phosphorus over a 24-hour period in an atmosphere of argon under reflux conditions. The reaction mixture is added to 400 ml. of water, following cooling, filtered and washed with water. The residue is dissolved in hot 2N sodium hydroxide solution, and the solution is again filtered to remove the residual phosphorus. The filtrate is acidified with concentrated hydrochloric acid and is extracted with methylene chloride. The methylene chloride extract is washed with water, dried with sodium sulfate and evaporated. The resulting 4-chloro-3-(2-chlorobenzyl)-phthalide, after recrystallization from acetone/low boiling petroleum ether, has a melting point of 129°–130°. 32.5 g. of 4-chloro-(2-chlorobenzyl)-phthalide are dissolved in a solution of 14 g. of potassium hydroxide in 350 ml. of water. Following concentration of the reaction mixture under reduced pressure, potassium-[3-chloro-2-(2-chloro-α-hydroxy-phenethyl)-benzoate]is obtained as a solid foam. 48.6 g. of potassium [3-chloro-2-(2-chloro-α-hydroxy-phenethyl)-benzoate]are dissolved in 100 and 300 ml. of dimethylsulfoxide and heated at 170° for 3 ½ hours in an atmosphere of argon. The reaction product is poured over ice-water and the entire mixture is acidified with 2N hydrochloric acid and extracted with methylene chloride. The methylene chloride extract is washed with water, dried with sodium sulfate and concentrated to yield 3-chloro-2-(2-chlorostyryl)-benzoate, having a melting point of 151°–155°.

15 g. of 3-chloro-(2-chlorostyryl)-benzoate are dissolved in 250 ml. of hydroiodic acid having a specific gravity of 1.75 and are agitated with 12 g. of red phosphorus over a 24-hour period at 125°. The reaction mixture is thereafter mixed with 200 ml. of water and filtered. The residue is dissolved in 50% sodium hydroxide solution with warming. Following filtration of the phosphorus residue, the solution is washed with ether, acidified with concentrated hydrochloric acid and extracted with methylene chloride. The methylene chloride extract is dried with sodium sulfate and evaporated to yield 3-chloro-2-(2-chlorophenethyl)-benzoate, having a melting point of 137°–139°.

50 g. of polyphosphoric acid are heated to 120°, and, in an atmosipihere of argon, 7 g. of 3-chloro-2-(2-chloro-phenethyl)-benzoate are added. The heating is continued over a 5-hour period at 150°. The reaction mixture is poured over ice and extracted with benzene. The benzene extract is washed first with 2N sodium hydroxide solution and then with water, dried over sodium sulfate and evaporated to yield 1,9-dichloro-10,11-dihydro-5H-dibenzo[a,d]cyclohepten-5-one, which after recrystallization from acetone/low boiling petroleum ether has a melting point of 185°–187°.

Through the utilization of 1.1 g. of Gilman alloy, 5.3 g. of dimethylaminopropyl chloride and 3.4 g. of 1,9-dichloro-10,11-dihydro-5H-dibenzo[a,d]cyclohepten-5-one, one obtains, according to the procedure of Example 1, 1,9-dichloro-10,11-dihydro-5-(3-dimethylaminopropyl)-5-hydroxy-5H-dibenzo[a,d]cycloheptene as a yellow oil, which is then immediately reacted further.

EXAMPLE 16

Tablets are prepared utilizing the following composition:

| | | |
|---|---|---|
| 1-chloro-10,11-dihydro-5-(3-methyl-aminopropyl)-5H-dibenzo[a,d]cycloheptene hydrochloride | 28.05 | g. |
| Lactose | 110 | g. |
| Maize starch | 57.95 | g. |
| Talcum | 3.40 | g. |
| Magnesium stearate | 0.6 | g. |
| | 200.00 | g. |

29

The ingredients are mixed together and compressed into tablets of 200 mg. each. Subsequently, they are coated with ethyl cellulose and Carbowax.

EXAMPLE 17

Tablets are prepared utilizing the following composition:

| | | |
|---|---|---|
| 1-chloro-5-(3-dimethylaminopropylidene)-5H-dibenzo[a,d]cycloheptene hydrochloride | 28.05 | g. |
| Lactose | 110 | g. |
| Maize starch | 57.95 | g. |
| Talcum | 3.40 | g. |
| Magnesium stearate | 0.6 | g. |
| | 200.00 | g. |

The ingredients are mixed together and compressed into tablets of 200 mg. each. Subsequently, they are coated with ethyl cellulose and Carbowax.

We claim:
1. A compound of the formula

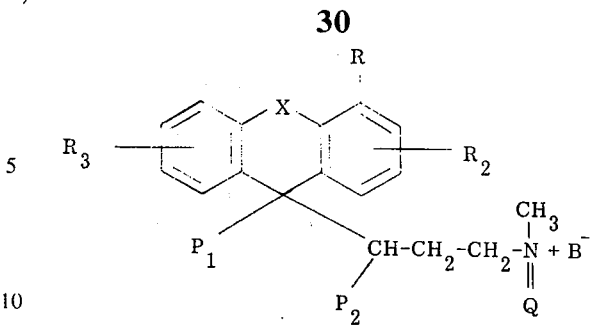

wherein R is chlorine or fluorine, $R_2$ and $R_3$ are hydrogen, chlorine or fluorine, X is ethylene, vinylene or a halo-substituted vinylene, one of $P_1$ or $P_2$ is hydrogen and the other is hydrogen or hydroxyl, or $P_1$ and $P_2$ taken together represent an additional bond, Q is benzylidene, and B is the anion of an acid selected from the group consisting of hydrochloric acid, sulfuric acid, methane-sulfonic acid, benzenesulfonic acid and toluenesulfonic acid.

* * * * *

UNITED STATES PATENT OFFICE
CERTIFICATE OF CORRECTION

PATENT NO. : 3,884,967
DATED : May 20, 1975
INVENTOR(S) : Emilio Kyburz & Hans Spiegelberg It is certified that error appears in the above-identified patent and that said Letters Patent are hereby corrected as shown below:

Cover Sheet, after "[60] Related U.S. Application Data" insert:

[30] Foreign Application Priority Data
Nov. 8, 1966     Switzerland     16144/66
Feb. 2, 1967     Switzerland     1651/67

Signed and Sealed this

*eighteenth* Day of *November 1975*

[SEAL]

Attest:

RUTH C. MASON
*Attesting Officer*

C. MARSHALL DANN
*Commissioner of Patents and Trademarks*